United States Patent [19]

Sakano

[11] Patent Number: 5,144,338
[45] Date of Patent: Sep. 1, 1992

[54] IMAGE RECORDER USING PULSE WIDTH MODULATION

[75] Inventor: Yukio Sakano, Tokyo, Japan

[73] Assignee: Ricoh Company, Ltd., Tokyo, Japan

[21] Appl. No.: 514,541

[22] Filed: Apr. 26, 1990

[30] Foreign Application Priority Data

Apr. 28, 1989 [JP] Japan .................................. 1-107537

[51] Int. Cl.[5] .............................................. H04H 1/21
[52] U.S. Cl. ...................................... 346/108; 358/296
[58] Field of Search .................... 346/107 R, 108, 160; 358/296, 300, 302

[56] References Cited

U.S. PATENT DOCUMENTS 4,620,136 10/1986 Bolger ................................. 315/371
4,768,043 8/1988 Saito et al. .......................... 346/108

FOREIGN PATENT DOCUMENTS 62-233980 4/1988 Japan .
62-233981 4/1988 Japan .

*Primary Examiner*—Mark J. Reinhart
*Attorney, Agent, or Firm*—Oblon, Spivak, McClelland, Maier & Neustadt

[57] ABSTRACT

An image recorder for recording an image by reading image data produced by quantizing the image pixel by pixel, subjecting the read image data to image processing, and then manipulating a laser beam modulated by pulse width modulation. A pixel of interest is recorded in a position which is controllable depending on the presence/absence or the densities of pixel data of pixels adjoining the pixel of interest. A laser beam is modulated by pulse width modulation, while the phase or the timing of pulses is controlled to control the recording position, whereby control circuitry is simple and economical.

9 Claims, 11 Drawing Sheets

Fig. 5

| TONE LEVEL (WHITE=0)(BLACK=63) | TONE RANK | WRITE PULSE WIDTH | RIGHT & LEFT RANK DIFFERENCE Δ=LEFT-RIGHT | PULSE PHASE | PULSE CODE |
|---|---|---|---|---|---|
| 0~15 | 0 | 0 (ns) | UNRELATED TO Δ | — | 0h |
| 16~23 | 1 | 12 (ns) | Δ ≧ 1 | I | 1h |
| | | | \|Δ\| = 0 | II | 2h |
| | | | Δ ≦ -1 | III | 3h |
| 24~31 | 2 | 20 (ns) | Δ ≧ 2 | I | 4h |
| | | | \|Δ\| < 2 | II | 5h |
| | | | Δ < -2 | III | 6h |
| 32~39 | 3 | 32 (ns) | Δ ≧ 2 | I | 7h |
| | | | \|Δ\| < 2 | II | 8h |
| | | | Δ ≦ -2 | III | 9h |
| 40~47 | 4 | 56 (ns) | Δ ≧ 3 | I | Ah |
| | | | \|Δ\| < 3 | II | Bh |
| | | | Δ < -3 | III | Ch |
| 48~63 | 5 | 80 (ns) | UNRELATED TO Δ | — | Dh |

Fig. 6

| TONE RANK | TONE RANK OF LEFT PIXEL | TONE RANK OF RIGHT PIXEL | PULSE PHASE |
|---|---|---|---|
| 1~4 | 1~5 | 0 | I |
| | 0 | 1~5 | III |

Fig. 12

| TONE LEVEL | TONE LEVEL OF LEFT PIXEL | TONE LEVEL OF RIGHT PIXEL | TONE RANK | PULSE PHASE | PULSE CODE |
|---|---|---|---|---|---|
| 8~15 | 8~15 | 8~15 | 1 | II | 2h |
| 8~15 | OTHERS | OTHERS | 0 | — | 0h |
| 16~23 | 8~15 | 8~15 | 2 | II | 5h |
| 16~23 | OTHERS | OTHERS | 1 | Fig.5 | Fig.5 |

IMAGE RECORDER USING PULSE WIDTH MODULATION

BACKGROUND OF THE INVENTION

The present invention relates to an image recorder for recording an image by causing a laser beam to scan a photoconductive element.

A laser printer and a digital printer are typical examples of an image recorder of the type recording visible image or an electrostatic latent image formed on a photoconductive element by manipulating a laser beam having been modulated by pixel-by-pixel quantized image data. To form a multi-level image by manipulating a laser beam, use is often made of a pulse width modulation (PWM) system. An image recorder implemented by a PWM system is disclosed in Japanese Patent Laid-Open Publication (Kokai) No 74368/1988. The image recorder disclosed in this Laid-Open Publication has a laser writing control device for generating a multi-level output by PWM. The writing control device is capable of start writing image data from the right or from the left, as desired. When this type of image recorder is used to render tones by the combination of PWM and dither, a dot concentration type pattern whose tone gently varies is formed.

However, the prior art image recorder of the type described has a problem left unsolved, as follows. Assume that an image to be recorded has a halftone hairline which extends over two nearby pixels in a main scanning direction. Then, the harline is written by using two pulses each being modulated to a medium pulse width which is narrower than one pixel. As a result, despite that the original hairline I is a single line, it is rendered as two separate segements each being thinner than the original hairline. This kind of split is apt to occur not only with such a hairline but also with an image portion where a transition from low density to high density takes place, edges of a thick line, characters contitued by lines, figures, etc.

A PWM type laser beam printer which controls the writing pulse width in response to density information of an image signal having multi-level density information is also taught in Japanese Patent Publication No. 30792/1986 and Japanese Patent Laid-Open Publication No. 23535/1979.

SUMMARY OF THE INVENTION

It is therefore an object of the present invention to eliminate the drawbacks particular to the prior art as discussed above.

It is another object of the present invention to provide a PWM type image recorder which records an image with high quality by preventing the image from being split into segments.

It is another object of the present invention to provide a generally improved PWM type image recorder.

In accordance with the present invention, in an image recorder for recording an image by manipulating a laser beam modulated by image data which is produced by quantizing the image pixel by pixel, a pixel of interest is recorded at one of a plurality of recording positions defined within a pixel interval on the basis of image data of pixels adjoining the pixel of interest.

An image recorder for recording an image by reading image data produced by quantizing the image pixel by pixel, subjecting the read image data to image processing, and then manipulating a laser beam modulated by pulse width modulation of the present invention comprises a phase information generating circuit for generating phase information representative of a recording position within one pixel interval at which a pixel of interest is to be recorded, on the basis of pixel data of two pixels preceding and following the pixel of interest in a main scanning direction of the laser beam, a pulse generating circuit for generating a plurality of pulses each having a different phase within one pixel interval, and a pulse selecting circuit for selecting one of the plurality of pulses being generated by the pulse generating circuit in response to the phase information generated by the phase information generating circuit.

Also, an image recorder for recording an image by reading image data produced by quantizing the image pixel by pixel, subjecting the read image data to image processing, and then manipulating a laser beam modulated by pulse width modulation of the present invention comprises a phase information generating circuit for generating phase information representative of a recording position within one pixel interval at which a pixel of interest is to be recorded, on the basis of pixel data of two pixels preceding and following the pixel of interest in a main scanning direction of the laser beam, a pulse width information generating circuit for generating pulse width information representative of a pulse width for recording the pixel of interest in response to image data of the pixel of interest, a pulse generating circuit for selectively generating one of a plurality of pulses each having a different phase or a different pulse width within one pixel, and a laser beam modulating circuit for selecting one of the plurality of pulses in response to the phase information from the phase information generating circuit and the pulse width information from the pulse width information generating circuit and modulating the laser beam on the basis of the selected pulse.

Further, an image recorder for recording an image by reading image data produced by quantizing the image pixel by pixel, subjecting the read image data to image processing, and then manipulating a laser beam modulated by pulse width modulation of the present invention comprises a pulse information generating circuit for generating pulse information representative of a phase and a width of a pulse for recording a pixel of interest, in response to image data of two pixels preceding and following the pixel of interest in a main scanning direction of the laser beam and image data of the pixel of interest, a pulse generating circuit for selectively generating one of a plurality of pulses each having a different phase or a different pulse width within one pixel interval, and a laser beam modulating circuit for selectively generating a pulse in response to the pulse information from the pulse information generating circuit and modulating the laser beam by the pulse.

BRIEF DESCRIPTION OF THE DRAWINGS

The above and other objects, features and advantages of the present invention will become more apparent from the following detailed description taken with the accompanying drawings in which:

FIGS. 5 and 6 are tables representative of an algorithm applied to an image processing section of the illustrative embodiment for transforming read image data into a pulse code;

FIG. 12 shows an algorithm applied to an image processing section which transforms read image data into a pulse code and representative of an alternative embodiment of the present invention.

DESCRIPTION OF THE PREFERRED EMBODIMENTS

To better understand the present invention, problems encountered with a prior art PWM type image recorder will be discussed specifically.

Figure 1A:
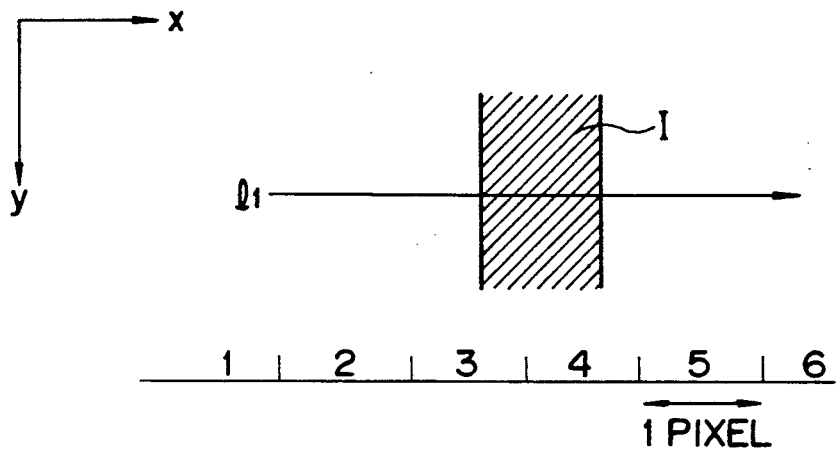
FIGS. 1A and 1B show an original image and an image reproduced by a prior art PWM type image recorder.
Figure 1B:
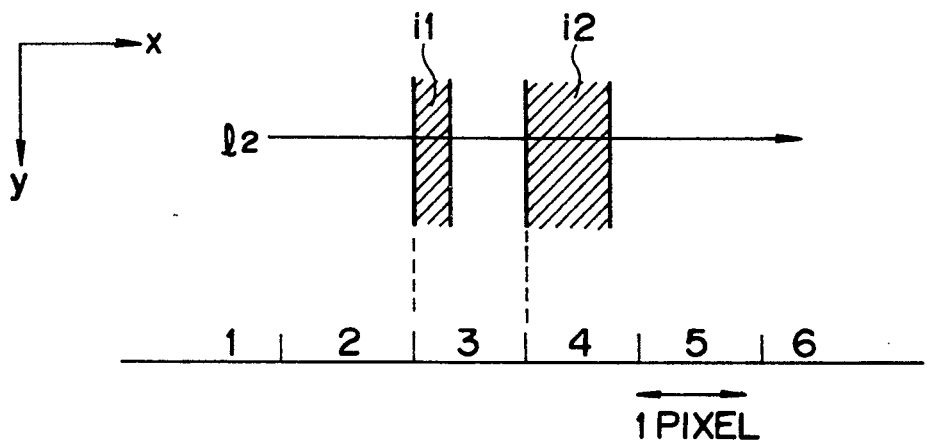

As shown in FIG. 1A, assume that an image to be recorded includes a halftone hairline I which extends over two nearby pixels, the third and fourth pixels in the figure, in a main scanning direction x and is continuous in a subscanning direction y. Further, assume that the hairline I is read along a read scanning line $l_1$ and written along a write scanning line $l_2$. Then, the harline I is written by using two pulses each being modulated to a medium pulse width which is narrower than one pixel width. As a result, despite that the original hairline I is a single line as shown in FIG. 1A, it is rendered as two separate segments $i_1$ and $i_2$ each being thinner than the hairline I, as shown in FIG. 1B. This stems from the fact that the hairline I is divided into the third and fourth pixels, and each is written from the beginning of the writing timing of the associated pixel of the write scanning line $l_2$ over a width which is associated with the read density. This kind of split is apt to occur not only with such a hairline but also with an image portion where a transition from low density to high density takes place, edge of a thick line, character constitued by lines, figure, etc.

Figure 2:
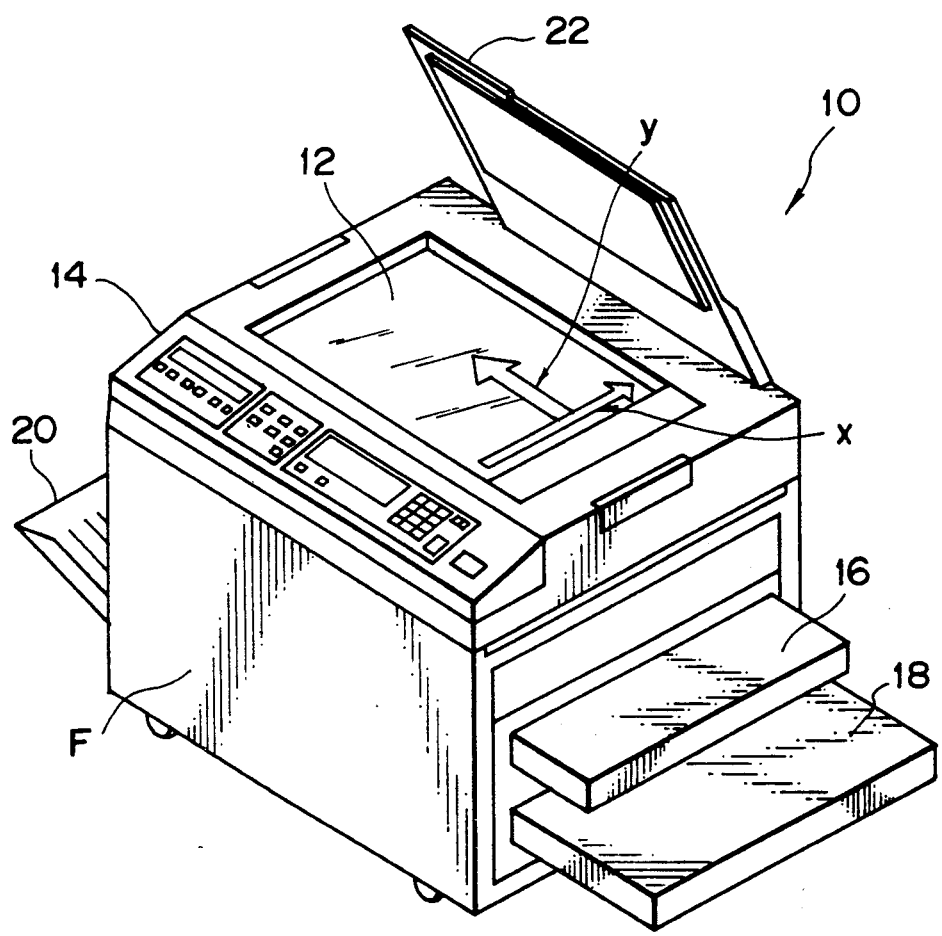
FIG. 2 is a perspective view of an image recorder embodying the present invention and implemented as a digital copier by way of example.

Referring to FIG. 2 of the drawings, an image recorder embodying the present invention is shown and implemented as a digital copier by way of example. As shown, the copier, generally 10, has a glass platen 12 at its upper end, and an operation board 14 at the front side F of the upper end. Two paper cassettes 16 and 18 are removably mounted on the copier 10 at the right-hand side as viewed from the front F, while a copy tray 20 is mounted on the copier 10 at the left-hand side. A top cover 22 is hinged to the upper end of the copier 10 to be movable toward and away from the glass platen 12. Incorporated in the copier 10 are a photoconductive element, optics for imagewise exposure, developing unit, fixing unit and other process units which are conventional with a digital copier, and a control unit for controlling such process units.

A document, not shown, is laid on the glass platen 12 face down. An illuminating device, focusing device and CCD (Charged Coupled Device) line sensor, not shown, read the document in a main scanning direction as indicated by an arrow x. At the same time, the illuminating and focusing devices are moved to read the document in a subscanning direction as indicated by an arrow y. The resulted image data are subjected to various kinds of image processing such as correction and conversion. A laser beam is modulated by the processed image data to electrostatically form a latent image on the photoconductive element. Thereafter, the image of the document is reproduced on a paper sheet fed from any one of the paper cassettes 16 and 18 by an electrophotographic procedure. The document image is read and written at the resolution of 400 dots per inch (approximately sixteen pixels per millimeter).

Figure 3:
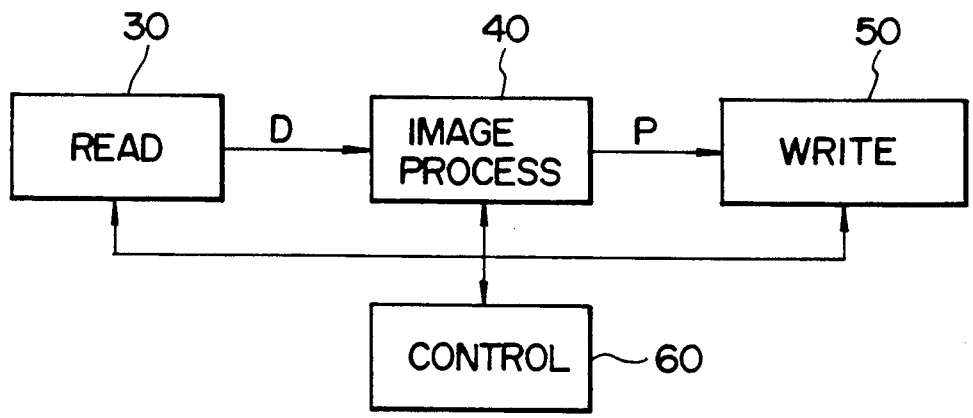
FIG. 3 is a block digram schematically showing processing executed in the copier for processing image data.

FIG. 3 is a functional block diagram demonstrating the operation of the digital copier 10, particularly the flow of image data. In the figure, image data read by a reading section 30 is fed to an image processing section 40 as a digital signal D which renders sixty-four tones by six bits pixel by pixel. The image processing section 40 codes the digital signal D to four bits which is a format suitable for writing. The output of the image processing section 40 is applied to a writing section 50. A control section 60 controls the reading section 30, image processing section 40, and writing section 50.

Figure 4:
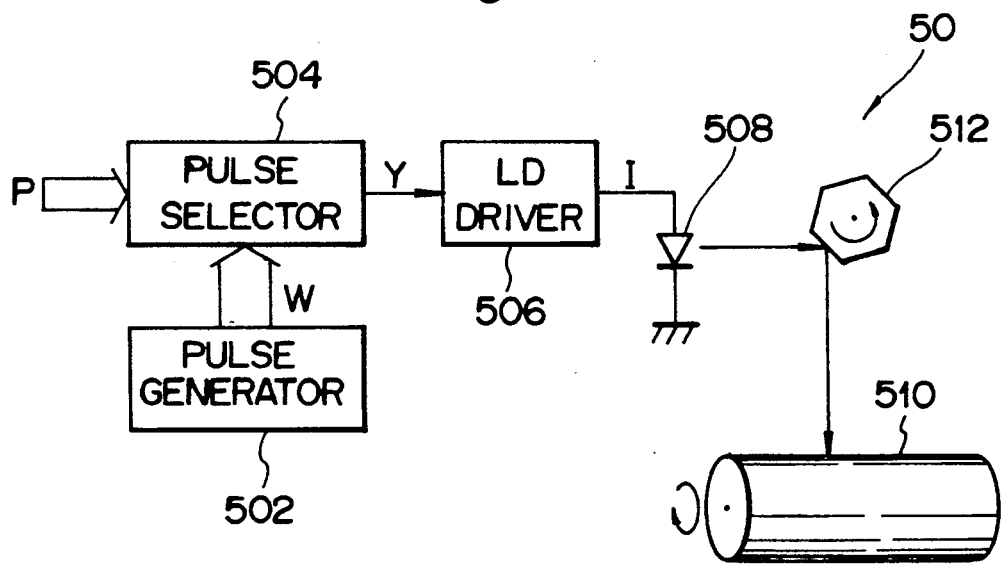
FIG. 4 is a schematic block diagram showing the construction of a writing section included in the illustrative embodiment.

FIG. 4 shows an essential part of the writing section 50. As shown, the writing section 50 has a pulse generator 502 which generates a group of pulse signals W having different pulse widths and phases. The coded image signal P from the image processing section 40 is fed to a pulse selector 504 as a select condition signal and selects one of the various kinds of pulses W. The pulse signal 504 outputs a digital pulse signal Y. A laser diode (LD) driver 506 converts the digital pulse signal Y into a drive signal I and delivers it to a laser diode (LD) 508, whereby the LD 508 emits light in response to the LD drive signal I. The laser beam is propagated through optics, not shown, to reach a photoconductive drum 510. A rotary polygonal mirror 512 causes the laser beam to scan the drum 510 in the main scanning direction, while the drum 510 is scanned by the laser beam in the subscanning direction due to its rotation. The writing section 50 is operable on the PWM basis. Specifically, the pulse width is associated with the amount and area of exposure on the drum 510 and, eventually, the area of black (toner) per unit area on a reproduction. Further, the pulse width is recognized as the density of an image and the width of a line by the viewer.

FIGS. 5 and 6 tabulate the algorithm for the image processing section 40 to transform the read image data or digital signal D into a pulse code signal. The digital signal D shown in FIG. 3 undergoes various kinds of processing such as shading correction, MTF (Modulation Transfer Function) correction and gamma correction at the image processing section 40. Such processing is not directly relevant to the present invention and, therefore, will not be described specifically. The 6-bit image signal P resulted from the above-mentioned processing is representative of any one of the tone levels shown in FIG. 5. Specifically, 6-bit sixty-four tones have a tone level 0 (white) to a tone level 63 (black). As FIG. 5 indicates, such sixty-four tone levels are classified into six consecutive ranks 0 to 5. A different pulse width for writing is assigned to each of the tone ranks 0 to 5. The pulse width is associated with the writing speed, i.e., 80 nanoseconds is associated with one pixel in the main scanning direction. For example, a pulse width of 80 nanoseconds will render the entire pixel in black, while a pulse width of 20 nanoseconds will render one-quarter or 25% of a pixel in black and the rest in white. In a strict sense, however, not precisely one-quarter of a pixel will be rendered in black due to the focus of the laser beam, sensitivity of a photoconductive element, particle size of toner, fluctuations of process conditions, etc.

The table of FIG. 5 includes a column "Right & Left Rank Difference $\Delta$=Left−Right". It is to be noted that the words "right" and "left" refer respectively to a pixel immediately preceding a pixel of interest in the main scanning direction x (left pixel on a document) and a pixel immediately following the pixel of interest (right pixel on a document). For example, in FIGS. 10A to 10G which will be described, assuming that the pixel whose tone level 38 is the pixel of interest, the left pixel has a tone level 25 while the right pixel has a tone level 7. Then, the difference $\Delta$ is the difference between the ranks to which the tone levels of the right and left pixels belong, and the phase of a pulse is determined on the basis of the difference $\Delta$. The "phase" of a pulse may be translated into the "position" of a pulse. Specifically, assuming that the pulse width remains the same, a pulse will be shifted to the left when in a phase I, centered when in a phase II, and shifted to the right when in a phase III, in relation to the relationship between the right and left pixels with respect to density. The pulse phases I, II and III are assigned as shown in FIG. 5, depending on the tone rank of the pixel of interest and the difference $\Delta$. Thus, fourteen different pulse codes 0h to Dh (h meaning "hexadecimal") are available in the form of combinations of the pulse widths and phases. These pulse codes are the image signal P outputted by the image processing section 40, FIG. 3.

FIG. 6 is a table supplementary to the table of FIG. 5 and shows extra processing. Specifically, when the pixel of interest belongs to any one of the tone ranks 1 to 4 while either one of the right and left pixels belongs to the tone rank 0, a pulse phase or pulse code will be assigned according to the table of FIG. 6. If the pixel at the right-hand-side of the pixel of interest belongs to the rank 0, the pulse phase I will be assigned, i.e., the pulse will be shifted to the left. Conversely, if the left pixel belongs to the rank 0, the pulse phase III will be assigned causing the pulse to shift to the right.

Figure 7:
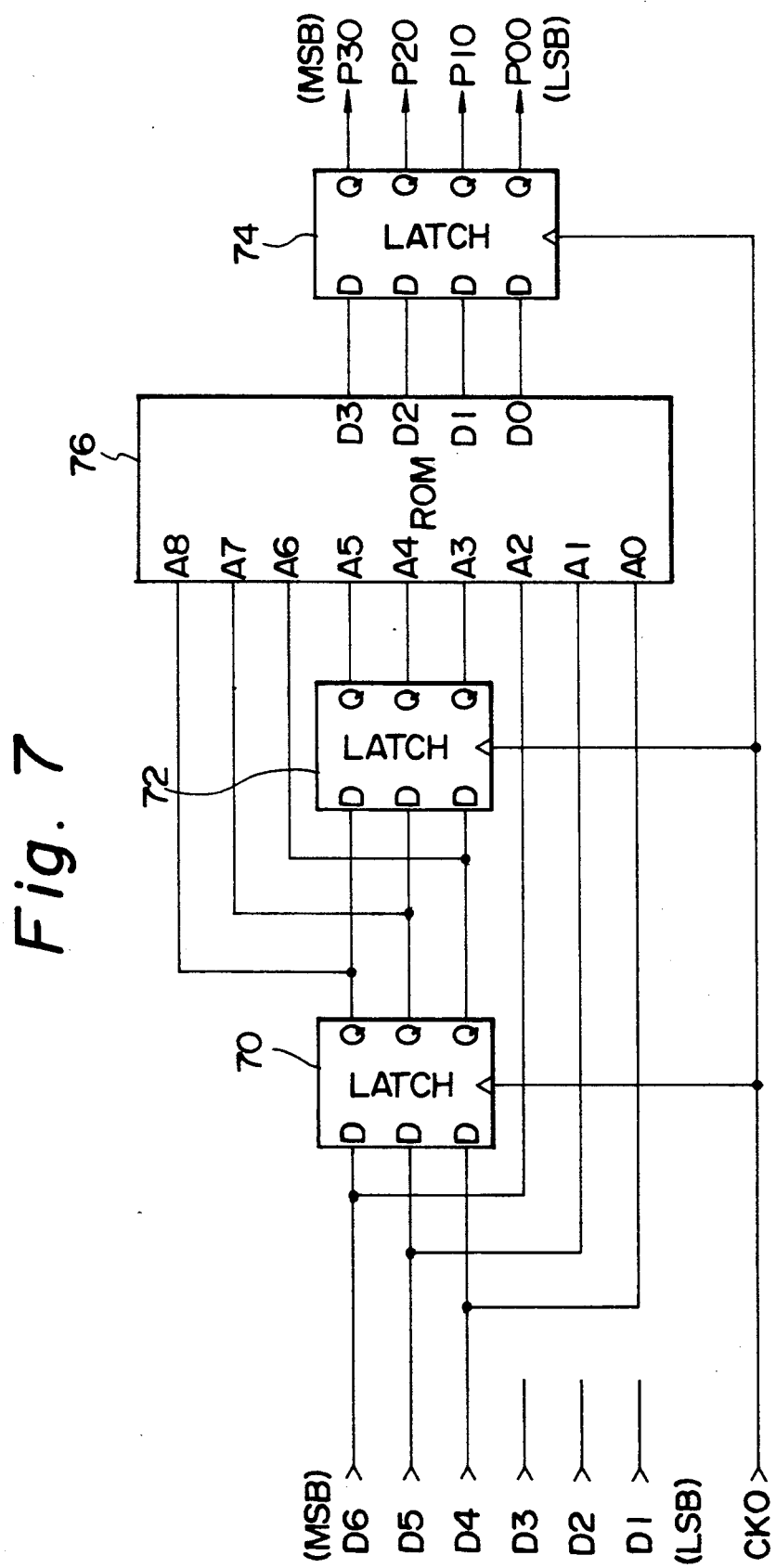
FIG. 7 is a diagram representative of a logic for implementing the algorithm of FIGS. 5 and 6.

Referring to FIG. 7, a logic for implementing the algorithm described above with reference to FIGS. 5 and 6 is shown. In FIG. 7, while $D_6$ to $D_1$ are representative of 6-bit image data, only upper three bits thereof will suffice because the tone levels are transformed into tone ranks as shown in FIG. 5. A pixel clock CK0 is applied to the image processing section 40. The circuitry of FIG. 7 has latches 70, 72 and 74, and a ROM 76. Signals $P_{30}$ to $P_{00}$ are representative of a 4-bit pulse code signal which corresponds to the image signal P shown in FIG. 3. The ROM 76 has address signal terminals $A_8$ to $A_0$. Among them, the upper three bits $A_8$ to $A_6$, the intermediate three bits $A_5$ to $A_3$, and the lower three bits $A_2$ to $A_0$ receive respectively the tone level of a pixel of interest, the tone level of a left pixel (scanned before the pixel of interest), and the tone level of a right pixel. Specifically, the tone levels of three pixels including the right and left pixels which are necessary for the pulse coding of FIG. 5 constitute the address of the ROM 76. The ROM 76 is loaded with the 4-bit pulse codes which are determined by the algorithm of FIGS. 5 and 6 in association with the individual addresses. These pulse codes are selectively read out of the ROM 76 in association with the pixel of interest and in synchronism with the image data $D_6$ to $D_4$ and clock CK0. The latch 74 is provided for the purpose of shaping the timings.

Figure 8:
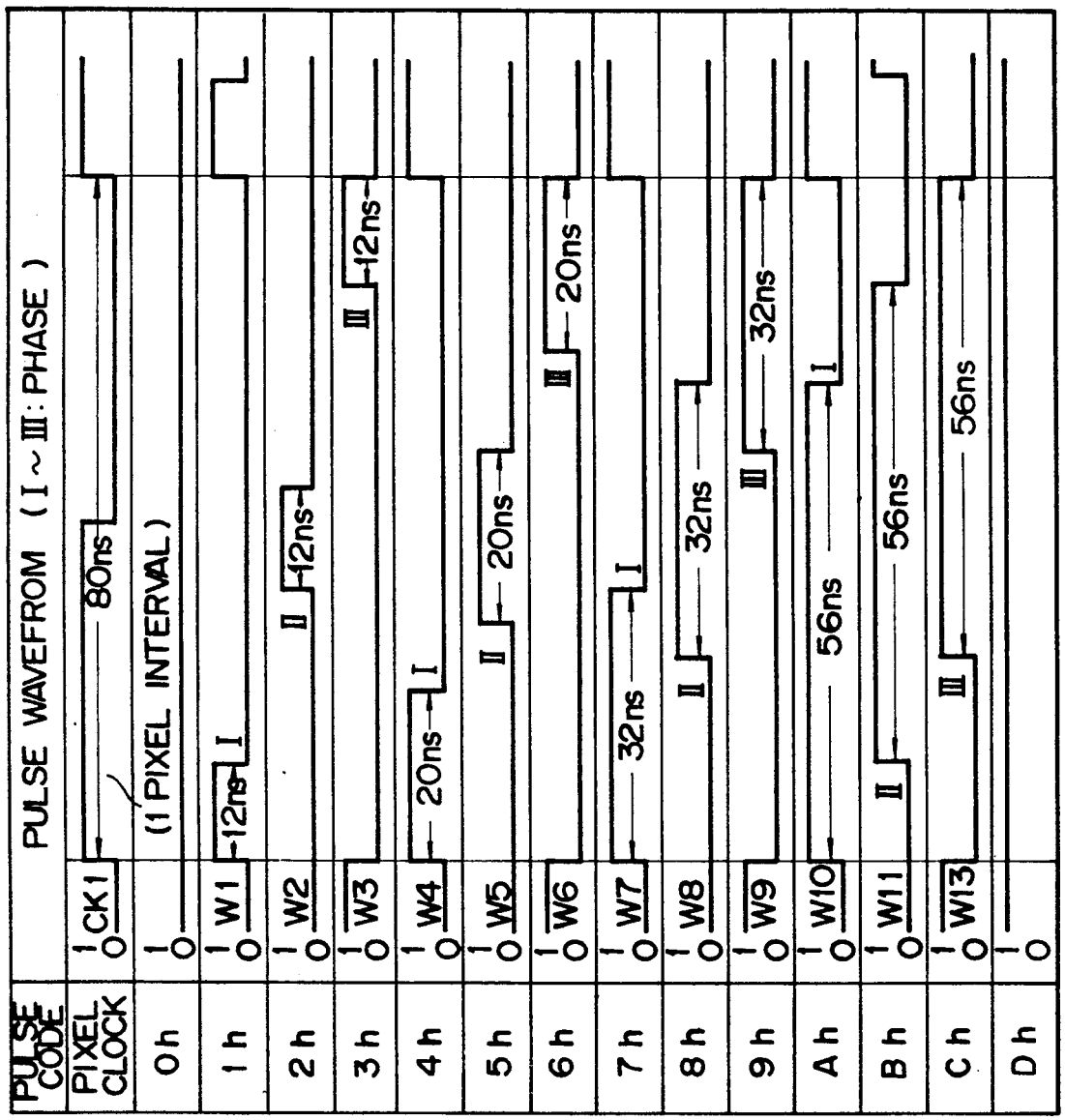
FIG. 8 shows waveforms representative of output pulses generated by a writing section included in the illustrative embodiment and each coresponding to a different pulse code.

FIG. 8 shows the waveforms of the group of pulses W which the pulse generator 502 of the writing section 50 generate and correspond to the pulse codes. In the figure, CK1 is indicative of a pixel clock applied to the writing section 50 and having a rate of 80 nanoseconds per pixel. The use of such a clock CK1 which is different from the pixel clock CK0 mentioned earlier is derived from the difference in effective scanning rate between the read main scanning and the write main scanning. As shown, pulses corresponding to the different pulse widths and phases shown in FIG. 5 are associated with the individual pulse codes. It is to be noted that the suffixes "1" and "0" in FIG. 8 are the logical levels of the pulse waveforms. The waveforms corresponding to the codes 0h and Dh are not provided with the symbol W indicative of a signal name, because they are either "0" or "1" throughout one pixel and, therefore, causing the pulse generator 502 to generate extra pulses is wasteful.

Figure 9:
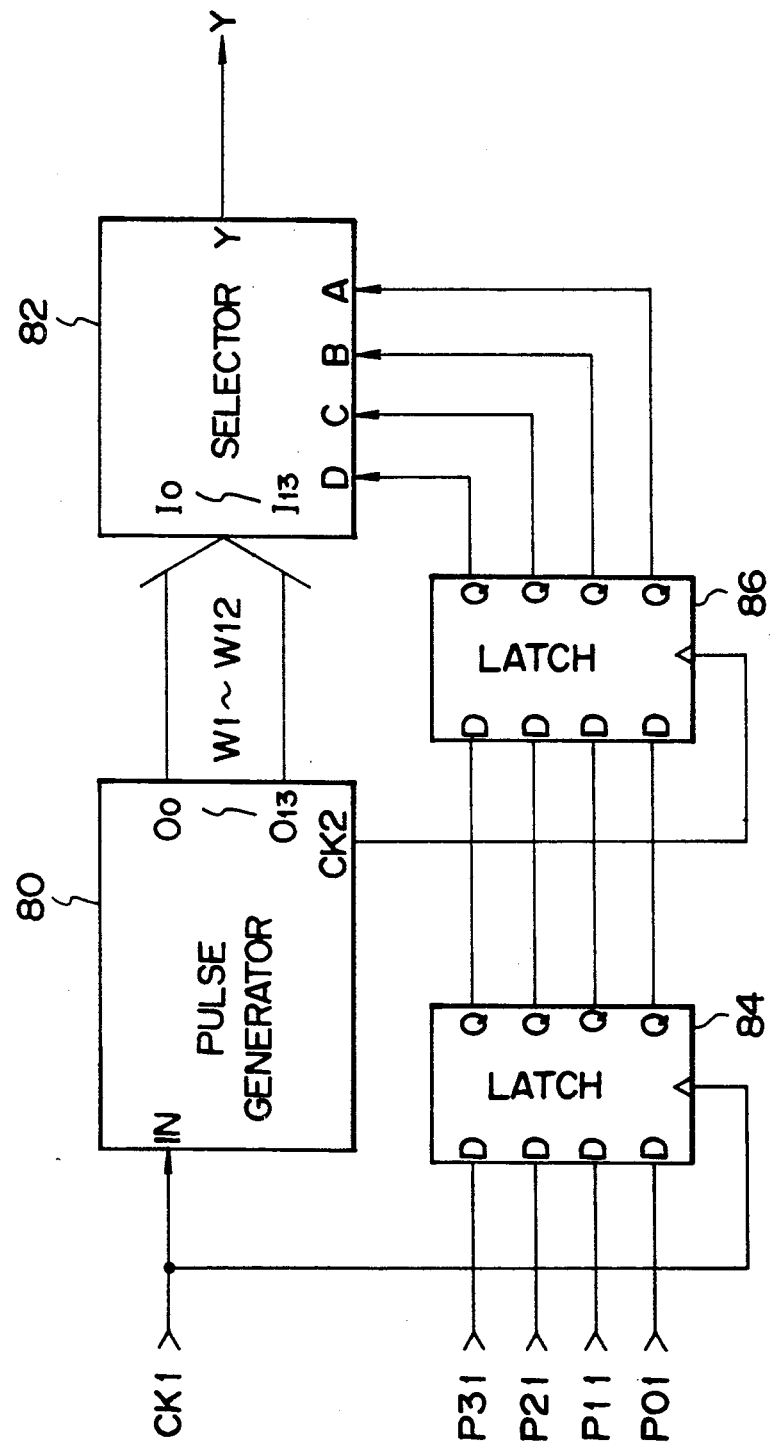
FIG. 9 is a block diagram schematically showing a pulse generating circuit and a logic assigned to a section which selects one pulse in response to an output pulse code of the pulse generating circuit.

Referring to FIG. 9, there is shown a pulse generating circuit and a logic for selecting one pulse in response to a pulse code signal which is ouputted by the pulse generating circuit. As shown, the logic basically comprises a pulse generator 80, a selector 82, and two latches 84 and 86. In response to the input signal CK1, the pulse generator 80 generates various kinds of delay signals by using delay elements and produces the pulses shown in FIG. 8 by ANDing and ORing the delay signals. Such a pulse generating logic may be modified in various manners as readily occur to those skilled in the art and will not be described herein specifically.

In FIG. 9, pulse code signals $P_{31}$, $P_{21}$, $P_{11}$ and $P_{01}$ are identical with the pulse code signals $P_{30}$, $P_{20}$, $P_{10}$ and $P_{00}$ shown in FIG. 7, except for the speed. Specially, while the pulse code signals $P_{30}$, $P_{20}$, $P_{10}$ and $P_{00}$ are synchronous with the pixel clock CK0 applied to the image processing section 40, the pulse code signals $P_{31}$, $P_{21}$, $P_{11}$ and $P_{01}$ are synchronous with the pixel clock CK1 applied to the writing section 50. Due to such a difference, the pulse code signals $P_{30}$, $P_{20}$, $P_{10}$ and $P_{00}$ outputted by the image processing section 40 in synchronism with the pixel clock CK0 and inputted to the writing section 50 are written to a line buffer, not shown, built in the writing section 50 in synchronism with the pixel clock CK0. Such pulse code signals $P_{30}$ to $P_{00}$ are read out of the line buffer in synchronism with the pixel clock CK1. By such a procedure, the speed is changed over from the pixel cock CK0 to the pixel clock CK1. This procedure is conventional and will not be shown or described specifically.

The pulse codes $P_{31}$, $P_{21}$, $P_{11}$ and $P_{01}$ are shaped in timing by the latch 84 and further shaped in timing by the latch 86. The latch 86 adequately times the amount of delay of the outputs $O_0$ to $O_{13}$ of the pulse generator 80 as measured from the inputs $I_0$ to $I_{13}$ of the selector 82 to the signal Y, and the amount of delay up to the time when the output of the signal Y is decided on the basis of the select conditions A, B, C and D, so that the pulse width of the input pulse may appear on the output accurately. The pulse generator 80 generates a clock signal CK2 for latching in association with the pulse generating timings. The clock signal CK2 is applied to the latch 86 in order to implement the above-mentioned function of the latch 86. In this manner, the signals $P_{31}$, $P_{21}$, $P_{11}$ and $P_{01}$ associated with the pulse code are selected and then outputted as the signal Y. Assuming that the pulse code is 6h, for example, then the logical values of the select condition signals D, C, B and A are respectively "0", "1", "1" and "0" and, therefore, the pulse $W_6$ shown in FIG. 8 is selected and outputted as the signal Y. It is to be noted that the signal Y of FIG. 9 corresponds to the signal Y of FIG. 4.

FIGS. 10A to 10G and 11A to 11C demonstrate a procedure attainable with the constructions and operations shown in FIGS. 2 to 9.

Figure 10A:
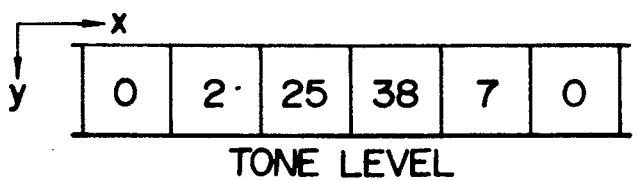
FIGS. 10A to 10G show specific image processing executed by the illustrative embodiment and specific image processing executed by the prior art.

FIGS. 10A to 10G show a relationship between the tone levels of an image read and a reproduced image associated therewith. For simplicity, let it be assumed that a line having a substantially one-pixel width and extending in the direction y as shown in FIG. 11A is scanned in the direction x. The following description will concentrate on a portion of such an image lying on one scanning line. When such an image is read, blurring occurs due to the MTF (spatial frequency characteristic) of the reading system so that the read image data has levels such as shown in FIG. 10A. The data shown in FIG. 10A will also be produced when a hairline whose width substantially corresponds to one pixel extends over two pixels, i.e., it is focused onto two nearby pixels on a CCD line sensor. In FIGS. 10A, 10B, 10C, 10E and 10G, one frame is representative of one pixel.

Figure 10B:
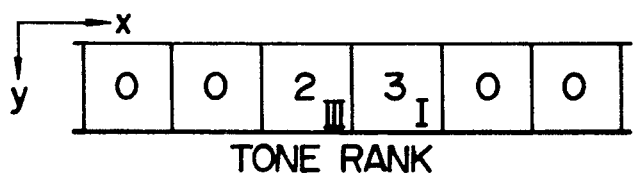
Figure 11A:
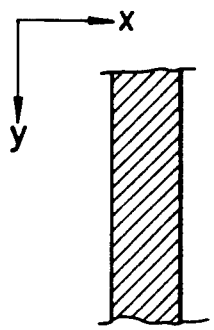
FIGS. 11A to 11C shows an original image and recorded images theeof.

FIG. 10B shows tone ranks corresponding to the tone levels of FIG. 10A. The tone levels can be readily classified into such ranks by using the algorithm of FIG. 5. The pulse phases I and III shown in FIG. 10B can also be readily determined on the basis of the relationship between the pixel of interest and adjoining pixels and the algorithm of FIG. 5.

Figure 10C:
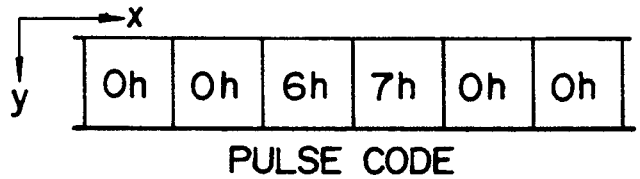
Figure 10D:
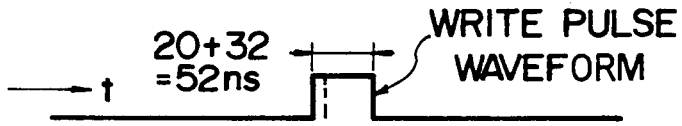
Figure 10E:
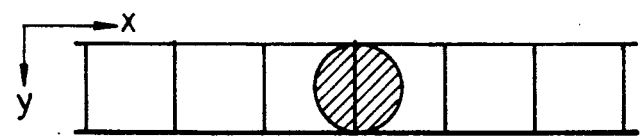
Figure 10F:
Figure 10G:
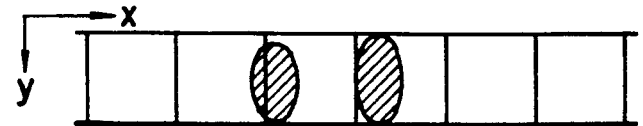

FIG. 10C indicates pulse codes corresponding to FIG. 10B and which can be easily determined by using FIG. 5. FIG. 10D shows a writing waveform (signal) Y, FIGS. 4 and 9, corresponding to the pulse codes of FIGS. 10C. Specifically, a pulse whose width is 20 nanoseconds exists in the position of the pulse phase III, and a pulse whose width is 32 nanoseconds exists at the position of the pulse phase I of the next pixel and is continuous with the preceding pulse. The result is a writing pulse which is a one pulse having a duration of 20+32=52 nanoseconds. FIG. 10E indicates an image generated by the pulse of FIG. 10D, i.e., a black image having an area associated with the pulse width of 52 nanoseconds is produced and has a diameter substantially corresponding to one pixel. FIG. 10F shows the waveform of a writing pulse which would be produced by the prior art technique. In FIG. 10F, the pulse phase is constantly fixed and a pulse width corresponding to the tone rank 2 or 3 is selected, resulting in two discrete pulses whose pulse widths are 20 nanoseconds and 32 nanoseconds. Such two pulses shown in FIG. 10F will reproduce two separate black images each being narrower than one pixel width and different from the other as to the size.

It should be born in mind that in FIGS. 10D to 10G the ratio of the pulse width to the time of 80 nanoseconds associated with one pixel and the ratio of the area of a black image to the area of one pixel (size of a frame) are not always linearly related to each other.

Figure 11B:
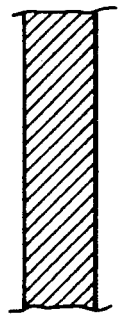
Figure 11C:
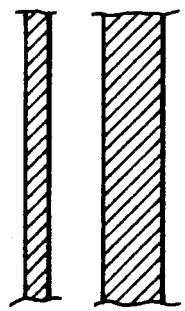
Figure 13A:
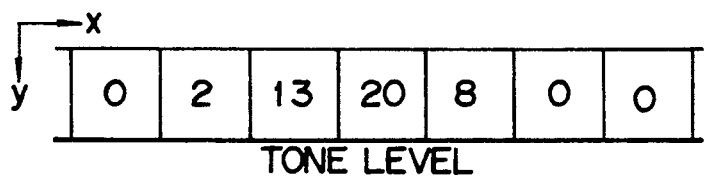
FIGS. 13A to 13H show specific image processing executed by the alternative embodiment and specific image processing executed by the prior art.
Figure 13B:
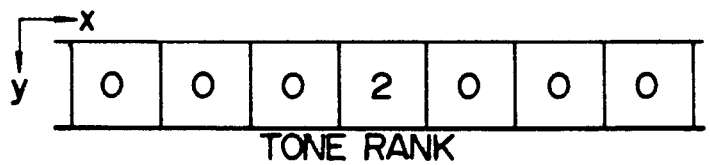
Figure 13C:
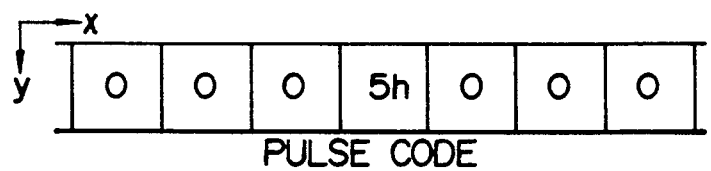
Figure 13D:
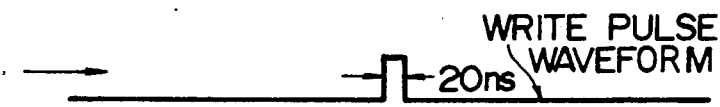
Figure 13E:
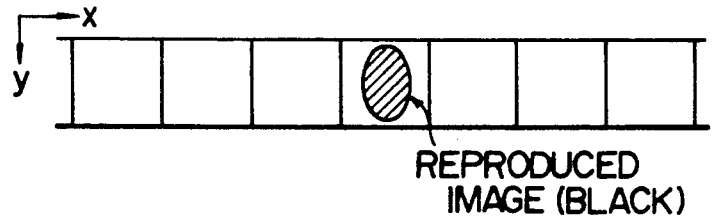
Figure 13F:
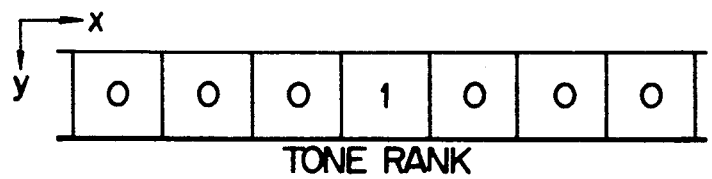
Figure 13G:
Figure 13H:
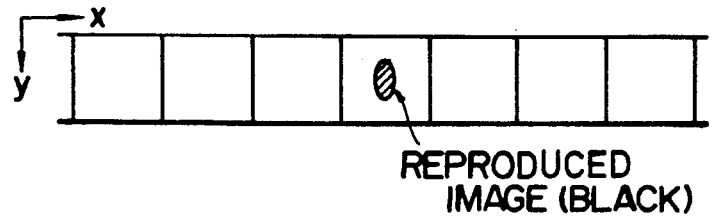

FIG. 11A shows a hairline extending parallel to the y axis on a document. FIG. 11B is representative of an image corresponding to FIG. 10E and reproduced by the illustrative embodiment. The image of FIG. 11B has substantially the same width as the original hairline of FIG. 11A. FIG. 11C shows an image corresponding to FIG. 10G and reproduced by the prior art, the image being decomposed into two separate lines having different widths. Apart from a straight line extending in the direction y as shown and described, when a straight line is slightly inclined relative to the y axis or depending on the focusing position on a CCD line sensor, the prior art causes a single line to appear as two separate lines at some portions and as one line at the other portions; even when reproduced as one line, it is apt to change in width. In contrast, the illustrative embodiment produces a single hairline whose width is substantially the same as the original hairline. The illustrative embodiment is capable of faithfully reproducing not only such a straight line but also a curve, a linear portion of a character or a figure, and even an edge of an image, thereby improving the quality of image reproduction.

The illustrative embodiment shown and described achieve unprecedented advantages as enumerated below.

(1) The recording position of a pixel of interest is controllable on the basis of the presence/absence of pixel data of pixels which adjoin a pixel of interest. This enhances the freedom in rendering the density and/or the shape of an image to thereby promote high quality image reproduction.

(2) The control circuitry is simple and economical because a laser beam is modulated on a pulse width basis and because the recording position is controlled by controlling the phase or the timing of the pulse.

(3) PWM allows pulses of two nearby pixels to be joined to produce a single pulse having a new pulse width. This also enhances the freedom in rendering the density and/or the shape of an image to thereby promote high quality image reproduction. Especially, a hairline extending over two pixels and an edge portion of a pixel are prevented from being split.

(4) Within a single pixel interval, three different recording positions are available in the main scanning direction, i.e., a forward position, a center position, and a rearward position. Therefore, when pixels preceding and following a pixel of interest are noticeably different in density from each other, the pixel of interest may be recorded in the position close to the pixel having higher density; when the difference in density is not noticeable, the pixel of interest may be recorded at the center. Consequently, even when the density, i.e., the pulse width remains the same, image data can be recorded by distinguishing an edge of an image and a uniform halftone area.

(5) The selector circuit serving as means for generating a group of digital pulses and selecting them one at a time can be implemented easily and economically by conventional digital logics technologies.

(6) Information associated with the pulse phase is represented by a coded signal, so that the kinds of signal lines and the circuit arrangement are simplified.

(7) Phase information and pulse width information are coded together to produce pulse information, again simplifying the kinds of signal lines and the circuit arrangement. When three kinds of phase information (two bits) and six kinds of pulse information (three bits) are available as in the illustrative embodiment, the pulse information in the form of a combination of such information can be produced in fourteen kinds Oh to Dh as indicated by the pulse codes in FIG. 5, i.e. four bits.

If desired, the conversion of a tone level to a pulse code may be implemented by an algorithm other than the algorithm shown in FIG. 5 and a logic other than the logic of FIG. 7. The pulse code may be determined on the basis of the relationship between a tone level and adjoining pixels, i.e., without ranking tone levels. Furthermore, the kinds of pulse codes and pulses, phases, generation of the group of pulses, and details of the logic of the selector may be modified as desired.

An alternative embodiment of the present invention will be described hereinafter. The alternative embodiment is identical with the previous embodiment concerning the constructions and operations of various sections of the copier. Hence, the following description will concentrate only on the constructions, operations and functions of the alternative embodiment which differ from the previous embodiment.

FIG. 12 is supplementary to FIG. 5 and is representative of the alternative embodiment of the present invention. Specifically, FIG. 12 indicates the rows of the table of FIG. 5 which are associated with the tone levels 0 to 15 and 16 to 23 in detail. As shown in FIG. 12, concerning these particular tone levels, the tone rank is determined on the basis of the levels of adjoining pixels in addition to the level of the pixel of interest, and a pulse phase is assigned to the determined tone rank on the basis of the tone levels of the adjoining pixels. So far as a portion where the tone level is low is concerned, when pixels adjoining a pixel of interest are greatly different in level from each other, they are representative of an edge of an image and, therefore, the algorithm of FIG. 5 is advantageously usable. However, when the tone levels of the preceding and following pixels in the main scanning direction are also low as shown in FIG. 12, it is likely that they represent a uniform and light halftone or a light hairline. In such a case, raising the rank by one and assigning the pulse phase II as FIG. 12 indicates is successful in improving the quality of a reproduction.

FIGS. 13A to 13H show a relationship between the tone level and the reproduced image, particularly the operation and advantage achievable with the algorithm of FIG. 12.

As stated above, the alternative embodiment achieves not only the advantages previously described in relation to the first embodiment but also an advantage that the kinds of signals and the construction of processing circuitry are simplified because pulse information are coded. Should only the phase information be coded by two bits and the pulse width information be coded by three bits or not coded at all and rendered in tone ranks or tone levels, more than five signal lines would be needed and, to implement the supplementary algorithm shown in FIG. 12, extra signal lines or processing circuitry would be required to further complicate the construction.

Various modifications will become possible for those skilled in the art after receiving the teachings of the present disclosure without departing from the scope thereof.

What is claimed is:

1. An image recorder for recording an image by reading image data produced by quantizing said image pixel by pixel, subjecting said read image data to image processing, and then controlling a signal supplied to a laser beam which is pulse width modulated, said image recording comprising:

phase information generating means for generating phase information representative of a recording position within one pixel interval at which a pixel of interest is to be recorded, on the basis of pixel data of two pixels preceding and following said pixel of interest in a main scanning direction of the laser beam, said phase information generating means storing in advance the phase information of a pixel of interest in relation to a combination of density data of pixels preceding and following the pixel of interest, and said pixel of interest is addressed by the density data of said preceding and following pixels to thereby generate said phase information of said pixel of interest;

pulse generating means for generating a plurality of pulses each having a different phase within one pixel interval; and pulse selecting means for selecting one of said plurality of pulses being generated by said pulse generating means in response to said phase information generated by said phase information generating means.

2. An image recorder as claimed in claim 1, wherein said phase information generating means further stores in advance the phase information of a pixel of interest in relation to the combination of the density data of preceding and following pixels and the density data of said pixel of interest, whereby said pixel of interest may be addressed by the density of said pixel of interest to thereby generate the phase information of said pixel of interest.

3. An image recorder as claimed in claim 2, further comprising a laser beam modulating means for selectively generating a pulse in response to pulse information from said pulse generating means.

4. An image recorder as claimed in claim 1, wherein said recording position is one of a forward position, a center position, and a rearward position within said pixel interval and with respect to a main scanning direction.

5. An image recorder as claimed in claim 1, wherein said pulse generating means generates pulse information representative of a phase and a width of said selected pulse for recording said pixel of interest based on density data of pixels preceding and following said pixel of interest.

6. An image recorder as claimed in claim 2, wherein an image processing means converts read image data signals generated by quantizing an image, into pulse coded signals representative of tone levels corresponding to each of a plurality of pixels.

7. An image recorder as claimed in claim 6, wherein said tone levels are grouped into tone ranks, whereby adjacent tone ranks are compared and cause said selected pulse to be one of centered, right-shifted, and left-shifted with respect to said pixel of interest.

8. An image recorder as claimed in claim 5, wherein said phase of said selected pulse corresponds to a position of said selected pulse within said pixel of interest.

9. An image recorder as claimed in claim 1, wherein individual pulses of two adjacent pixels may be joined into a single pulse with a new pulse width which is the sum of the pulse widths of said individual pulses.

* * * * *